(12) United States Patent
Huang et al.

(10) Patent No.: US 8,949,513 B2
(45) Date of Patent: Feb. 3, 2015

(54) DATA COMPRESSION AND COMPACTING FOR MEMORY DEVICES

(75) Inventors: ChengKuo Huang, Sunnyvale, CA (US); Siu-Hung Fred Au, Fremont, CA (US); Sean Lee, Fremont, CA (US); Fei Sun, Santa Clara, CA (US); Grace Pao Yi Chen, San Jose, CA (US); Man Cheung, San Jose, CA (US); Xueshi Yang, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 266 days.

(21) Appl. No.: 13/467,173

(22) Filed: May 9, 2012

(65) Prior Publication Data

US 2012/0290798 A1 Nov. 15, 2012

Related U.S. Application Data

(60) Provisional application No. 61/484,573, filed on May 10, 2011.

(51) Int. Cl.
*G06F 12/02* (2006.01)
*G06F 3/06* (2006.01)

(52) U.S. Cl.
CPC ...... *G06F 12/0246* (2013.01); *G06F 2212/401* (2013.01); *G06F 3/0608* (2013.01); *G06F 3/064* (2013.01); *G06F 3/0679* (2013.01)
USPC .......................................... 711/103; 707/693

(58) Field of Classification Search
USPC .......................................... 711/103; 707/693
See application file for complete search history.

(56) References Cited

U.S. PATENT DOCUMENTS

| | | | |
|---|---|---|---|
| 5,652,857 A * | 7/1997 | Shimoi et al. ................. 711/113 |
| 2002/0071332 A1 * | 6/2002 | Nishiyama et al. ...... 365/230.01 |
| 2003/0079081 A1 * | 4/2003 | Okada et al. .................. 711/113 |
| 2010/0211737 A1 | 8/2010 | Flynn et al. |

OTHER PUBLICATIONS

Andrew S. Tanenbaum, Modern Operating Systems, 2001, Prentice-Hall, Inc., second edition, pp. 200,201, 205, 206.*
Yim et al., A Flash Compression Layer for SmartMedia Card Systems, IEEE Transactions on Consumer Electronics, Feb. 2004, IEEE, pp. 192-197.*
PCT Search Report mailed Aug. 22, 2012 for PCT application No. PCT/US12/37364, 9 pages.

* cited by examiner

*Primary Examiner* — Jared Rutz

(57) ABSTRACT

Embodiments of the present disclosure provide apparatuses and methods for determining a compacting arrangement to store logical addressable units, which include compressed data sectors, into hardware addressable units of a storage device. The compacting arrangement is based on compression information associated with the logical addressable units. A write module is used to write the compressed data sectors to the storage device according to the compacting arrangement.

23 Claims, 8 Drawing Sheets

DATA COMPRESSION AND COMPACTING FOR MEMORY DEVICES

CROSS REFERENCE TO RELATED APPLICATIONS

This disclosure claims priority to U.S. Provisional Patent Application No. 61/484,573, filed May 10, 2011, the entire specification of which is hereby incorporated herein by reference in its entirety for all purposes, except for those sections, if any, that are inconsistent with this specification.

TECHNICAL FIELD

Embodiments of the present disclosure relate to the field of solid state memory devices, and more particularly to techniques, devices, and systems for compressing and compacting data stored in storage devices, such as solid state devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Solid state memory devices, such as flash memory devices, often have a limited lifespan. In particular, memory cells within a solid state memory device are erased prior to being written with new data. But those memory cells can only be erased a certain number of times before data retrieval from those memory cells starts to become unreliable. Various methods are employed to make flash memory devices last longer, such as wear leveling. Wear leveling attempts to write new data to memory cells that have had fewer previous writes than other cells. Also, stable data (data that is stored for a relatively long time and is infrequently changed) may be moved to a new location to free up the relatively under-written memory cells that the stable data previously occupied. This way, the memory cells in the device can be aged at approximately the same rate, thereby extending the life of the solid state memory device. But these operations become more difficult as the solid state device reaches a relatively full state.

SUMMARY

In one embodiment, the present disclosure provides an apparatus for compressing and compacting data. A hardware data compressor of the apparatus compresses data sectors received from a computing system, and determines compression information associated with a plurality of logical addressable units that include at least one of the compressed data sectors. A compactor module of the apparatus determines a compacting arrangement based on the compression information. The compacting arrangement compacts logical addressable units into corresponding hardware addressable units. A write module causes the compressed data sectors to be written to a storage device according to the compacting arrangement. The hardware data compressor may determine the logical addressable units and their corresponding compressed data sectors from the logical block addresses of the data sectors. The storage device may be a solid state device, such as Flash memory.

In another embodiment, the present disclosure provides a method for compressing data sectors received from a host computing device. Based on logical block addresses of the plurality of compressed data sectors, a plurality of logical addressable units are determined. Based on the compression ratios of the logical addressable units, corresponding hardware addressable units are determined. The logical addressable units of the corresponding hardware addressable units are written to the storage device. The writing may be part of a program operation of the storage device, part of a read-modify-write operation, or part of a garbage collection operation. The storage device may be a solid state device, such as Flash memory.

In a further embodiment, the present disclosure provides a method for reading a target data sector from a storage device. A target logical addressable unit is retrieved from the hardware addressable unit of the storage device based on a target logical block address of the target sector. The target logical addressable unit includes a compressed one of the target sector and compression information associated with the target logical addressable unit. The target data sector is decompressed based on the compression information. The decompressed target data sector is output to the host computing system. The storage device may be a solid state device, such as Flash memory.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Overview

As discussed previously, solid state memory devices, such as flash memory devices, have limited life spans, determined in part by the number of times that the memory cells are erased and re-written. Various wear leveling schemes are utilized to increase the usable life of a solid state memory device by uniformly aging the memory cells of the device. Embodiments of the present application utilize compression and compacting operations on data written to a solid state memory device. In addition to expanding the storage capabilities of a device, these compression and compacting operations can increase the usable lifespan of the device. Compressed and compacted data requires fewer memory cells to be written to store the same amount of data, thereby requiring fewer and less frequent erase cycles on the memory cells. Also, compressed and compacted data results in fewer pages on the device that contain written data, thereby making it easier to perform wear leveling operations.

Illustrative Memory Storage Device

Figure 1:
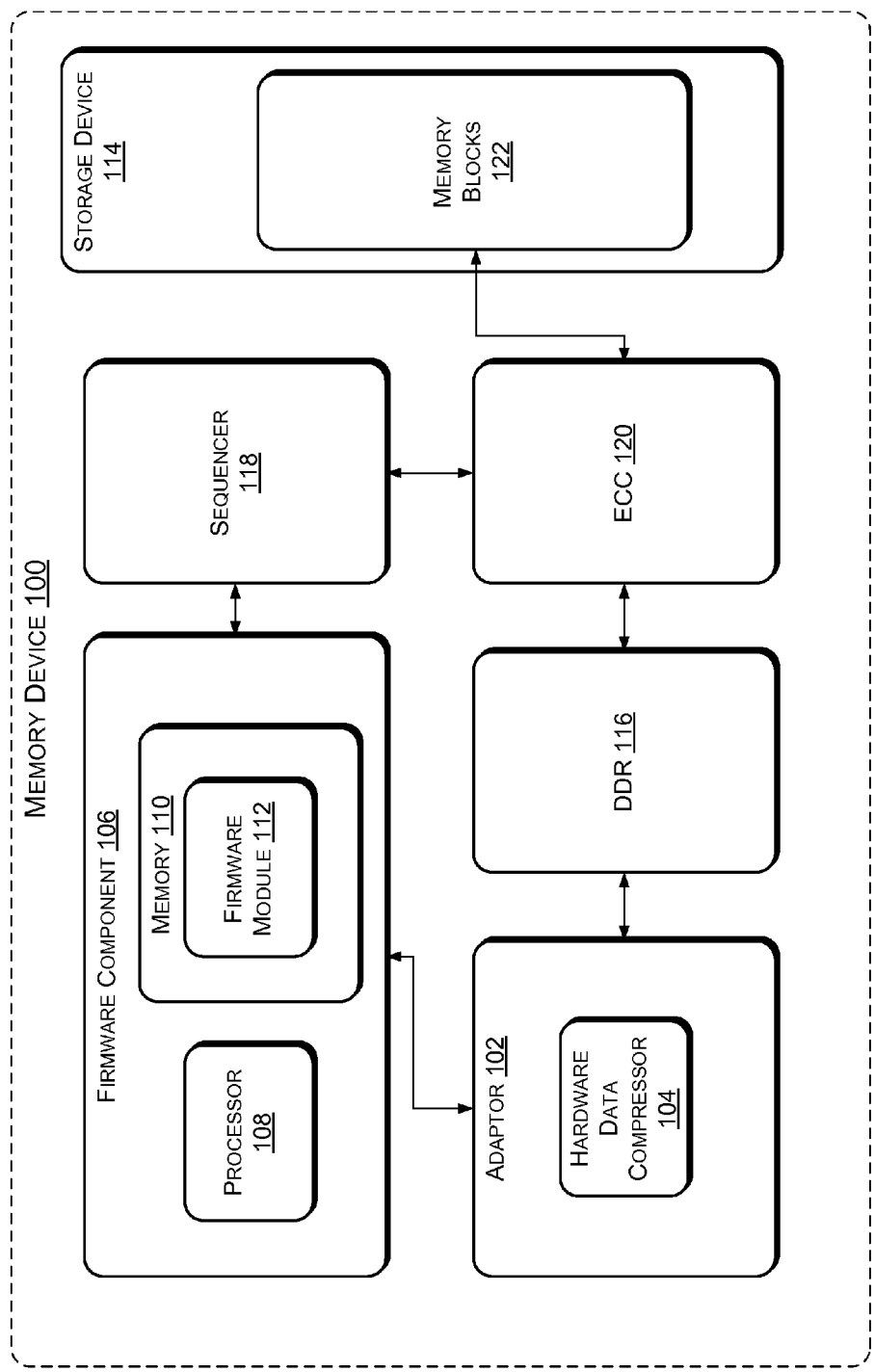
FIG. 1 is a schematic diagram of an example of a memory device that performs compression and compacting operations according to embodiments.

FIG. 1 is a schematic diagram of an example of a memory device 100 that performs compression and compacting operations according to embodiments. Memory device 100 includes an adaptor 102 configured to be communicatively coupled with a host computing system. The adaptor 102 may be a computer bus interface, such as a SATA or other interface device (such as a Parallel Advanced Technology Attachment (PATA)). The adaptor 102 includes a hardware data compressor 104, which is configured to compress data sectors received from the host computing system. The hardware data compressor 104 may utilize various compression schemes to remove redundant data or otherwise reduce the size of the data sectors. The hardware data compressor 104 is also configured to determine sets of the compressed data sectors to be grouped into logical addressable units (LAUs). A LAU may be, in embodiments an eight kilobyte (8K) unit of data. Thus, according to one example, the uncompressed data sectors may be 1K in size, and a LAU would therefore have eight data sectors, meaning that an uncompressed LAU would have a size of 8K. After compression, a LAU would have less than 8K of data assuming that the data was compressible.

The hardware data compressor 104 is configured to report compression information associated with the LAUs to a firmware component 106. The compression information may be a reported compression ratio that is determined according to a schedule of compression ratios. The hardware data compressor 104 determines an actual compression ratio for the data sectors of a particular LAU, and rounds the actual compression ratios up to the nearest ratios according to the schedule in order to determine the reported compression ratio. For example, the hardware data compressor 104 may be configured to report the reported compression ratio using two bits, resulting in a total of four possible reported compression ratios in a schedule. According to one example, the schedule includes ratios of 12.5%, 25%, 50%, and 100%. More information regarding compression ratio reporting can be found elsewhere within this Detailed Description.

The firmware component 106 may include a processor 108 and a memory 110 that stores firmware module 112. In that case, the firmware module 112 is executable by the processor 108 to perform the functions and operations of the firmware module 112. Alternatively, the firmware module 112 may be part of a logic circuit, such as an application specific integrated circuit (ASIC) or a field programmable gate array (FPGA), that performs the functions and operations of the firmware module 112. In either case, the firmware module 112 is configured to determine from the reported compression ratios a set of LAUs that fit into a hardware addressable unit (HAU) to be stored on the storage device 114, which may be for example a solid state device, such as Flash memory. A HAU represents a block of data on the storage device 114 and may be the same size as an uncompressed LAU, although it may be a different size. According to one example, the firmware module 112 determines that two particular LAUs with uncompressed sizes of 8K have a reported compression ratio of 50%, and can therefore be written to the storage device 114 within a single HAU of 8K. The firmware module 112 accepts read and write commands, performs garbage collection operations, wear leveling operations, and maintains a look-up table as are described in more detail below.

After being compressed, the LAUs are temporarily written to the double data rate (DDR) device 116. Upon being written to the DDR 116, the LAUs are not compacted, and thus take up an entire block of data within the DDR 116. The firmware component 106 prepares a descriptor that designates the LAUs that are to be compacted into a single HAU, and provides the descriptor to the sequencer 118. The sequencer 118 cooperates with the error correction circuit (ECC) 120 to write the LAUs specified by the descriptor from the DDR 116 to the memory blocks 122 of the storage device 114 as a single compacted HAU. HAUs are stored in the memory blocks 122 with headers that include, among other things, the number of LAUs contained therein.

On a read operation, the firmware component 106 creates a descriptor identifying the HAU that contains the LAU(s) that, in turn, contain the data sector(s) identified by the read command. The descriptor includes not only a HAU address but an identifier that indicates a position within the HAU that contains the target LAU with the data sector(s) to be read. The identifier may be a mask, or some other data that indicates the position of the target data within the HAU. The sequencer 118 cooperates with the ECC 120 to read the target LAU and the associated compression information. The LAUs are placed into the DDR 116, and the compression information is provided to the hardware data compressor 104 (either by the firmware component 106 or through the DDR 116) in order to uncompress the data sector(s). The adaptor 102 then outputs the uncompressed data sectors to the host computing system.

In summary, the hardware data compressor 104 compresses data sectors received from a host computing system, and groups the compressed data sectors into logical addressable units (LAUs). The LAUs with the compressed data sectors are written to the dual data rate (DDR) device 116, and the hardware data compressor 104 reports compression information to the firmware module 112. The firmware module 112 determines from the reported compression information a set of LAUs that can fit into a hardware addressable unit (HAU) for storage on the storage device 114. The firmware module 112 provides a descriptor to a sequencer 118 which cooperates with the error correction circuit (ECC) 120 to write the set of LAUs compacted together into a single HAU on the storage device 114. Without compression and compacting, each LAU (including a group of uncompressed data sectors) would be written to a single HAU on the storage device 114. But with compression and compacting, two or more LAUs may be written to a single HAU, thereby resulting in fewer memory pages being used to store the data sectors on the storage device 114.

Example Compacting Scheme

Table 1 illustrates how LAUs may be determined from logical block addresses of data sectors and from "command end" signals. The example in Table 1 assumes that there are eight data sectors per LAU. The number of data sectors per LAU may be a number $x=2^y$, where y is an even integer. In Table 1, the LBA and LAA are shown in hexadecimal format and there are eight data sectors per LAU (y=3). Thus, the LAU boundaries are determined by data sectors having LBAs that end in hexadecimal 7 or hexadecimal f (i.e., every $8^{th}$ sector). Also, LAU boundaries may be set based on receipt of a "command end" signal from the SATA (or other interface adaptor). For example, sectors 1 and 2 are in LAA0, and sectors 3-10 are in LAA1 based on the fact that sector 2 has an LBA that ends in hexadecimal 7, and sector 10 has an LBA that ends in hexadecimal f.

Also, sectors 11 and 12 are in LAU2 and LAU3, respectively due to receipt of a "command end" signal. And sectors 13-15 are in LAU4 due to receipt of a "command end" signal at the end of sector 15.

TABLE 1

| Sector | Logical Block Address | LAU Address |
|---|---|---|
| 1 | 0x12345606 | LAA0 |
| 2 | 0x12345607 | LAA0 |
| 3 | 0x12345608 | LAA1 |
| 4 | 0x12345609 | LAA1 |
| 5 | 0x1234560a | LAA1 |
| 6 | 0x1234560b | LAA1 |
| 7 | 0x1234560c | LAA1 |
| 8 | 0x1234560d | LAA1 |
| 9 | 0x1234560e | LAA1 |
| 10 | 0x1234560f | LAA1 |
| 11 | 0x12345610 *command end | LAA2 |
| 12 | 0x12345612 *command end | LAA3 |
| 13 | 0x12355612 | LAA4 |
| 14 | 0x12355613 | LAA4 |
| 15 | 0x12355614 *command end | LAA4 |

LAA2-4 may be examples of LAUs that result from read-modify-write commands, which receive special treatment. In particular, the firmware utilizes the compression ratios of the individual sectors in those LAUs (as opposed to an overall compression ratio of the LAUs) to determine the HAUs in which to compact them. The firmware may obtain this information from the sector headers stored in the DDR.

Figure 2:
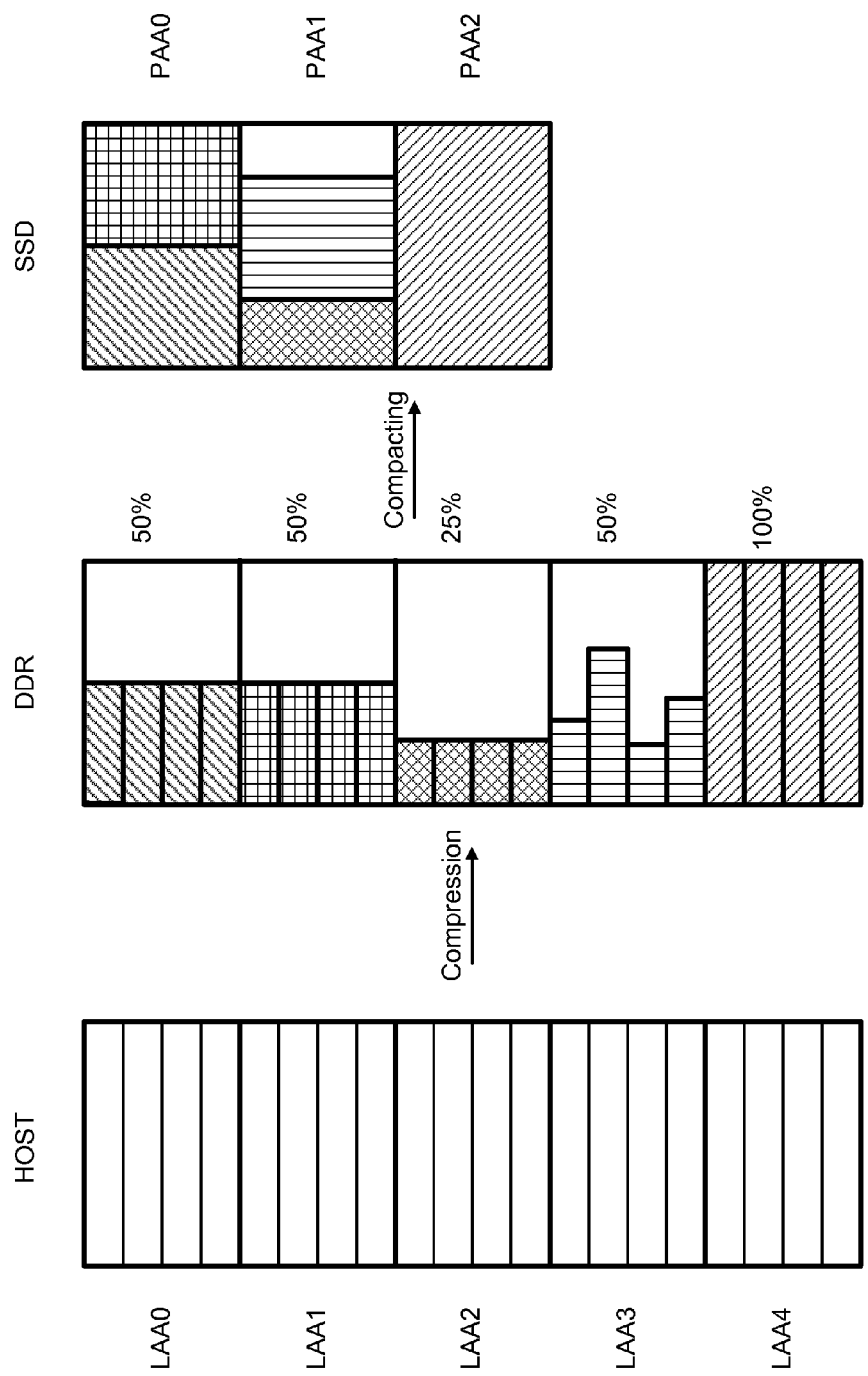
FIG. 2 illustrates a compression and compacting scheme according to various embodiments.

FIG. 2 illustrates a compression and compacting scheme according to various embodiments. The HOST column in FIG. 2 shows a plurality of data sectors received from a host computing system, grouped according to LAUs, with four data sectors per LAU. Embodiments are not limited to any particular number of numbers of sectors per LAU. There are five LAUs shown in FIG. 2 with LAU addresses labeled as LAA0 through LAA4. These LAU addresses may be determined as is described with reference to Table 1, or by some other scheme.

The data sectors shown in the HOST column are uncompressed sectors from the host computing system (the individual rows of the HOST column represent the data sectors). After compression, the sectors take up less space. For example, the sectors in LAA0 stored in the DDR are all compressed to 50%, and LAA0 therefore takes up 50% of a block of memory in the DDR. The compacting scheme is not employed on LAUs written to the DDR, so some space within the DDR memory blocks remains empty. The sectors in LAA1 are also compressed to 50% and sectors in LAA2 are compressed to 25%. The data sectors in LAA3 are not uniformly compressible, but the overall compression ratio of LAA3 is 50%. LAA4 is compressed with a compression ratio of 100%. The compression ratios shown in FIG. 2 are the reported compression ratios, not actual compression ratios. Thus, the actual compression ratios of LAA0, LAA1, and LAA3 are between 25% and 50%, the actual compression ratio of LAA2 is between 0% and 25%, and the actual compression ratio of LAA4 is between 50% and 100%. The sectors are shown in FIG. 2 as if they are compressed to their reported compression ratios for the sake of illustration. Thus, an actual compression ratio for LAA4 is somewhere between 50% and 100%. It is possible for a sector to be uncompressible. In that case, the sector is not reported as having a 100% compression ratio, but as being uncompressible (such as with an uncompressible bit). FIG. 2 illustrates no uncompressible sectors.

Upon being compacted, the LAUs will be grouped together into HAUs. Table 2 is an example of a look-up table that is maintained by the firmware, and corresponds to FIG. 2. The firmware causes the LAUs stored in the DDR to be written to the storage device (SSD) as compacted into single HAUs within. The size of a HAU may, in various embodiments, correspond to the size of memory pages of the storage device (although they may differ from the memory page size).

TABLE 2

| LAU Address (LAA) | HAU address (PAA) | LAU position |
|---|---|---|
| LAA0 | PAA0 | first |
| LAA1 | PAA0 | second |
| LAA2 | PAA1 | first |
| LAA3 | PAA1 | second |
| LAA4 | PAA2 | first |

LAA0 in FIG. 2 is stored in PAA0, at position "first" which may be indicated by a binary number. Position "first" indicates that LAA0 is the first LAU within PAA0. LAA1 is stored in PAA0, but in position "second" indicating that it is the second LAU within PAA0. The LAU position may be indicated by a binary number. A two-bit binary number may be used when there are a maximum of four LAUs per HAU. A three-bit binary number may be used when there are a maximum of eight LAUs per HAU, and so forth.

Example Data Sectors and Compression Ratio Schedule

Figure 3:
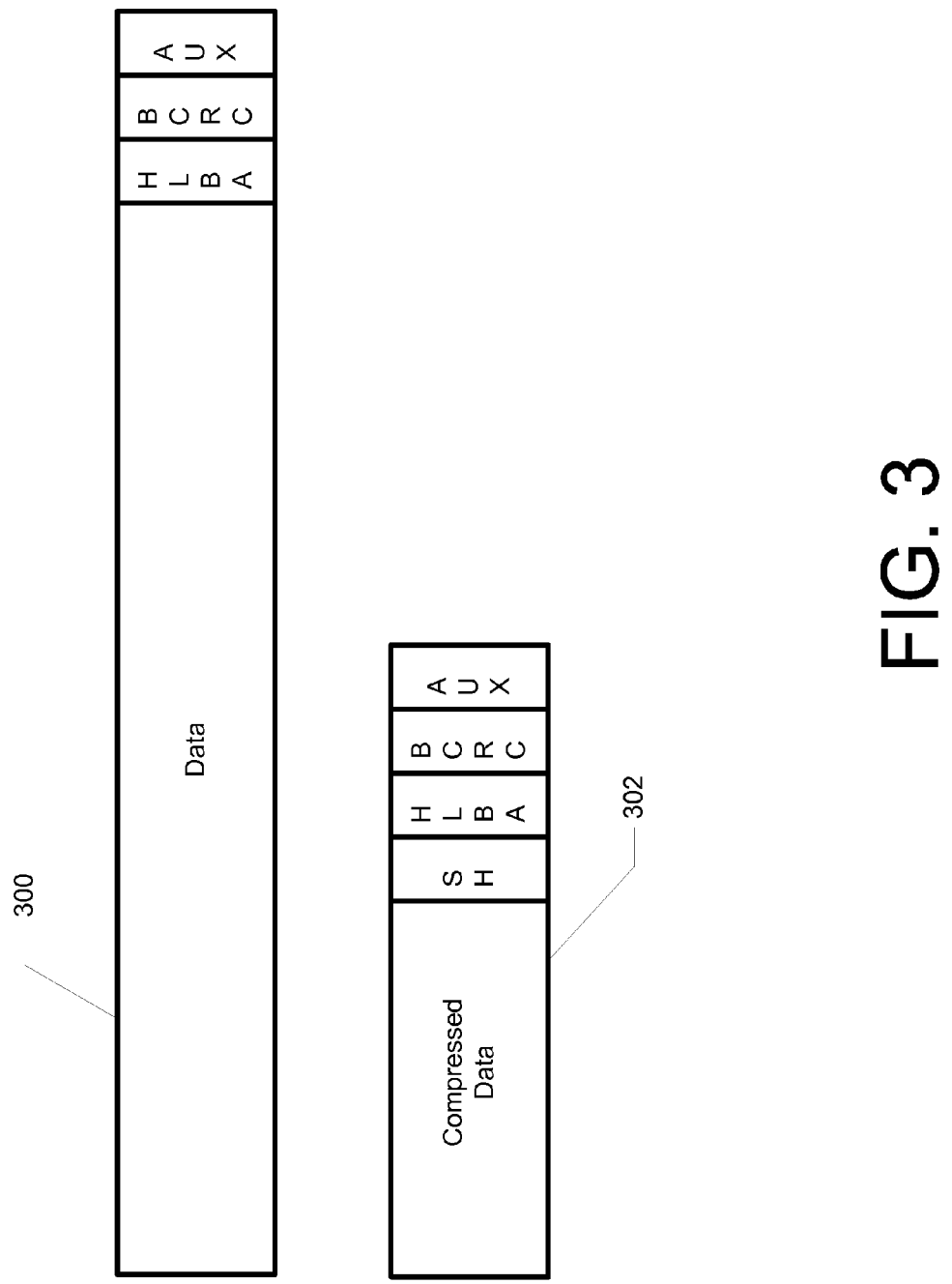
FIG. 3 illustrates an example of an uncompressed data sector and a compressed data sector according to embodiments.

FIG. 3 illustrates an example of an uncompressed data sector 300 and a corresponding compressed data sector 302 according to embodiments. Uncompressed data sector 300 includes sector data and various additional information bytes, such as a Host Logical Block Address (HLBA), Block Cyclic Redundancy Check (BCRC), and AUX, which come from the host computing system. Upon compression, the compressed data sector includes compressed sector data as well as the additional information bytes (which are not compressed) and a sector header (SH). The sector header includes, among other things, compression information for the compressed data sector (such as an actual and/or reported compression ratio or percentage). The sector header also includes a length of the compressed data sector. This enables the hardware data compressor to know where to read the sector from the LAU prior to decompression when the sector is read out of the memory device.

When reporting the compression ratio, the hardware data compressor considers not only the size of the compressed data, but also the size of the additional bytes and the sector header. In embodiments, the additional bytes and the sector header may be 12 bytes, or some other number of bytes. As noted elsewhere within this Detailed Description, the reported compression ratio is determined by rounding up an actual compression ratio to the next highest ratio in a schedule of compression ratios. Table 3 shows an example compression ratio schedule and the corresponding ranges of actual compression ratios.

TABLE 3

| Actual Compression Ratio (x) with Information Bytes and Sector Header | Reported Compression Ratio |
|---|---|
| $x \leq 12.5\%$ | 12.5% |
| $12.5\% < x \leq 25\%$ | 25% |
| $25\% < x \leq 50\%$ | 50% |
| $x > 50\%$ | 100% |

The hardware data compressor may utilize a two-bit binary number to report the reported compression ratio. For example, binary 00 may indicate a compression ratio of 12.5%, 01 may indicate a compression ratio of 25%, and so forth. Reporting compression ratios according to a schedule, rather than reporting actual compression ratios, simplifies the compacting scheme. For example, the firmware assumes that a LAU reported to have a 50% compression ratio take up to 50% of the space of a HAU, and can therefore be grouped with one other LAU having a reported compression ratio of 50%, two additional LAUs having reported compression ratios of 25%, four additional LAUs having reported compression ratios of 12.5%, or some other combination of LAUs (such as two additional LAUs with reported compression ratios of 12.5% and one additional LAU with a reported compression ratio of 25%). In the example shown in Table 3, the minimum reported compression ratio according to the schedule is 12.5%. Thus, the maximum number of LAUs compacted into a single HAU is eight, in this example. But embodiments are not limited to compression ratio schedules as shown in Table 3. Other compression ratios may be used (having more, fewer and/or different ratios) without departing from the scope of the present disclosure.

Example Logical Addressable Unit

Figure 4:
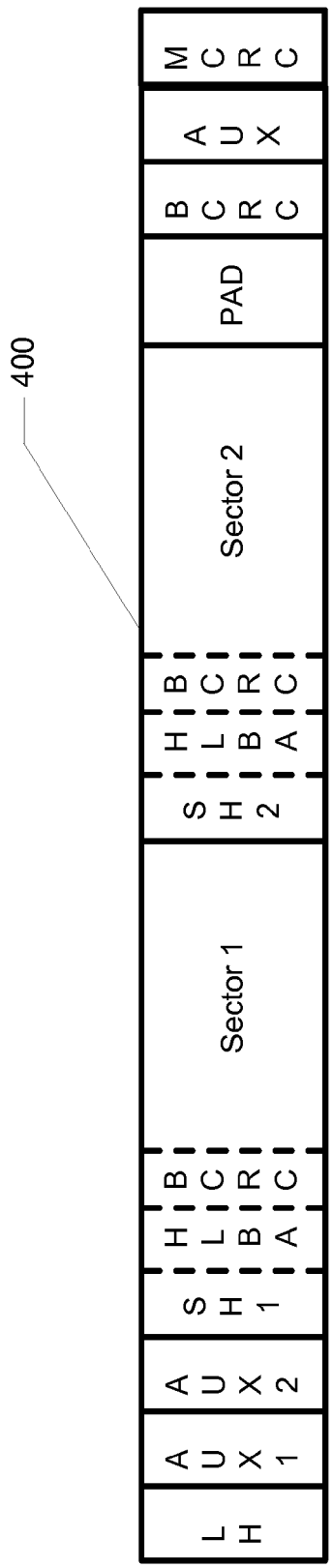
FIG. 4 illustrates an example of a logical addressable unit with compressed sectors according to embodiments.

FIG. 4 illustrates an example of a logical addressable unit (LAU) 400 with compressed sectors according to embodiments. The LAU 400 includes two sectors labeled sector 1 and sector 2, respectively. The LAU 400 includes LAU header (LA) which include various information about the LAU such as whether it contains all incompressible sectors, or if at least one sector is compressible. The sectors 1 and 2 include sector headers (SH) and additional bytes (HLBA and BCRC). The AUX additional bytes are shown included outside of the compressed sectors, but may be included within the sectors, or elsewhere within the LAU. The LAU 400 includes Media Cyclic Redundancy Check (MCRC) bits to aid in error correction or detection. The example of FIG. 4 includes two sectors per LAU. Other embodiments may include additional numbers of sectors per LAU, such as for example four, eight, or sixteen sectors per LAU. LAU 400 includes two sectors for the sake of illustration. Pad bits may also be included within the LAU 400. Embodiments are not limited to the specific arrangement shown in FIG. 4.

Example Hardware Addressable Unit

Figure 5:
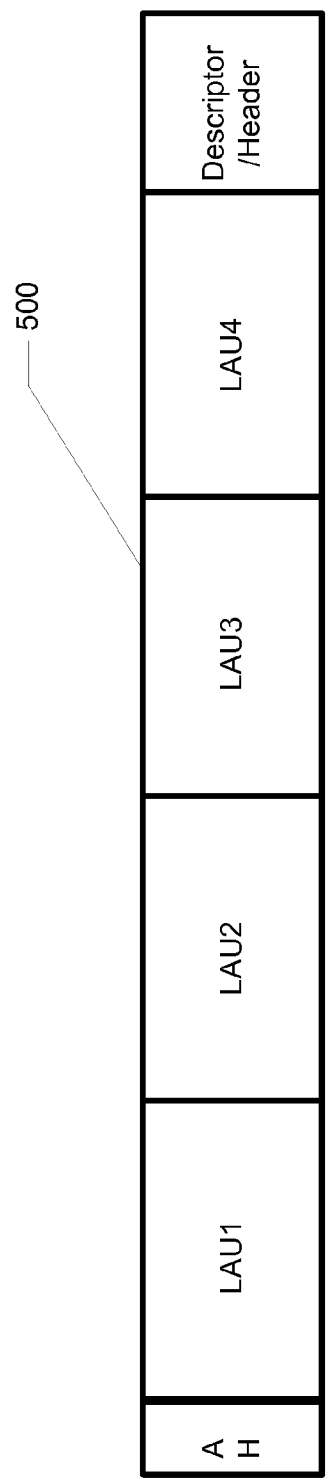
FIG. 5 illustrates an example of a hardware addressable unit with a set of logical addressable units according to embodiments.

FIG. 5 illustrates an example hardware addressable unit (HAU) 500 with a set of LAUs according to embodiments. The example HAU of FIG. 5 includes four LAUs (LAU1 through LAU4), although HAUs can have more or fewer LAUs without departing from the scope of the present disclosure, depending for example on the different compression ratios of the LAUs. LAU1 through LAU4 may have multiple compressed sectors, such as is depicted in FIG. 4, for example. The AH header component of HAU 500 indicates whether the entire HAU is incompressible, or whether there is at least one compressed sector within the LAU. The Descriptor/Header includes, among other things, information about the number of LAUs stored in the HAU. The descriptor may be, for example, a three-bit binary number if the maximum number of LAUs stored in a HAU is eight (which may correspond to a minimum reported compression ratio of 12.5%). The sector headers are stored along with the sectors within the LAUs which include, among other things, the compression information associated with the sectors.

Example Firmware Module

Figure 6:
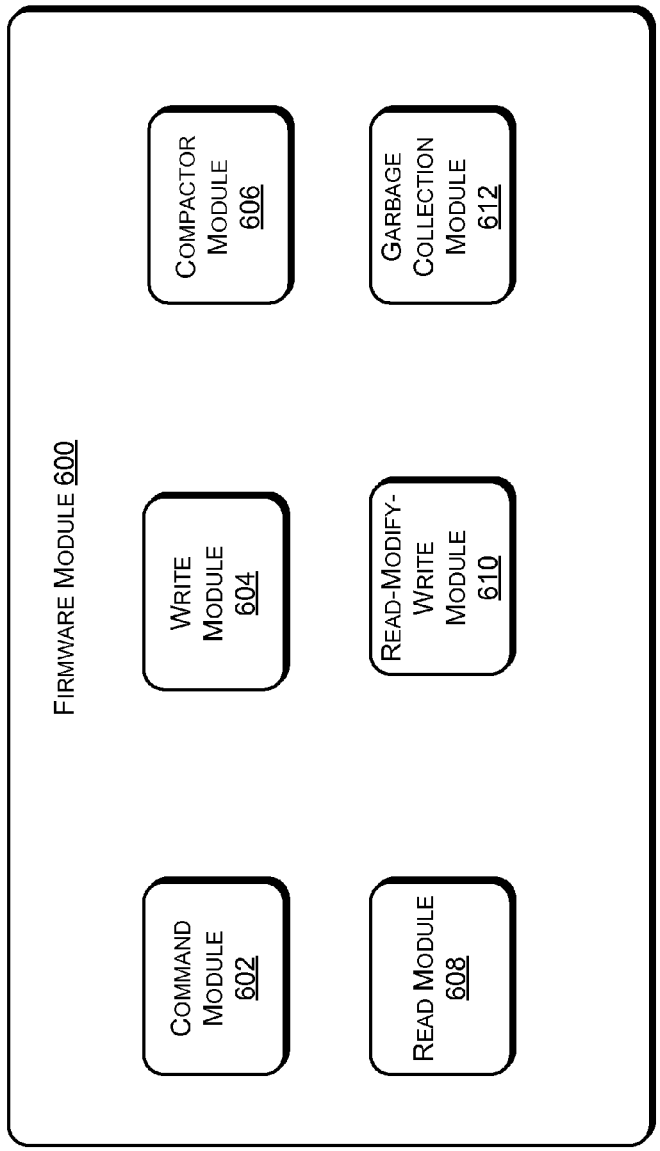
FIG. 6 is a schematic diagram of a firmware module for performing compression and compact operations according to embodiments.

FIG. 6 is a schematic diagram of a firmware module 600 for performing compression and compacting operations according to embodiments. The firmware module 600 may be the same as or different than the firmware module 112 of FIG. 1. Thus, the firmware module 600 may include a plurality of programming instructions stored on a memory, such as the memory 110 of FIG. 1, and be executable by a processor, such as the processor 108 of FIG. 1. Alternatively, the firmware module 600 may be a logic circuit, such as an application specific integrated circuit (ASIC) or a field programmable gate array (FPGA), that performs the functions and operations designated by the various components of the firmware module 600.

A command module 602 is configured to receive various memory commands from a host computing system, such as read, write, erase, read-modify-write, and other commands. The command module 602 responds to the various commands by directing the commands to the various other components of the firmware module 600 as appropriate.

Upon receipt of a write command, the command module 602 directs the command to the write module 604. The write module 604 is configured to direct an adaptor, such as adaptor 102 of FIG. 1, to receive data sectors from the host computing system, and a hardware data compressor, such as the hardware data compressor 104 of FIG. 1, to compress the incoming data sectors.

A compactor module 606 is configured to determine, based on compression information reported by the hardware data compressor, a compacting arrangement wherein a subset of the plurality of LAUs are compacted into a hardware addressable unit (HAU) of a plurality of HAUs. The compactor module 606 is further configured to maintain a look-up table that maps LAU addresses to corresponding HAU addresses, according to the compacting arrangement. The look-up table also includes index bits for a particular LAU that indicate a position within a particular HAU that includes the particular LAU.

To determine the LAUs that are to be compacted into the same HAU, the compactor module 606 utilizes the compression information. The compression information may indicate a compression ratio or compression percentage. Based on the compression ratio reported for a particular LAU (or for the particular data sectors within the LAU), the compactor module 606 determines how large the compressed LAU is relative to the HAU (including a sector header added to the compressed sectors and other information bytes described elsewhere within this Detailed Description). According to one example, the sectors may be 1K, an uncompressed LAU may be 8K (thereby including 8 sectors), and a HAU may be 8K. Thus, a reported compression ratio of 25% for a particular LAU (including overhead) means that the LAU will occupy no more than 25% of a HAU (or 2K). Thus, more than one LAU may be compacted into a single HAU. The compactor module 606, upon determining that a particular LAU is to be compacted into a particular HAU, will update the look-up table to indicate that a LAU address of the LAU is associated with a HAU address of the HAU.

The compactor module 606 may perform compacting operations as are described herein as part of write (program) operations, on garbage collection operations, or both. Where compacting operations occur on garbage collection only, data that is written to the storage device during a write operation is compressed, but not compacted, such that a single compressed LAU is stored in a HAU on the storage device. During garbage collection operations, the LAUs are compacted based on the compression information as is described elsewhere within this Detailed Description. The compression information may be passed to the compactor module 606 at the time of compression, or the compression information may be passed to the compactor module 606 at the time of the garbage collection operations (the compression information is stored in the sector headers of the compressed data sectors).

During compacting operations, the write module 604 is configured to cause the compressed data sectors of the LAUs to be written to a solid state memory according to the determined HAUs. To do this, the write module 604 prepares a descriptor that identifies the LAUs that are to be compacted into a particular HAU. The descriptor also includes the compression information associated with those LAUs. The write module 604 instructs a sequencer, such as the sequencer 118 of FIG. 1, to cause the LAUs (which have been stored in a DDR device, such as DDR 116) to be written to the storage device in a single HAU.

Upon receipt of a read command from the host computing system to read one or more data sectors, a read module 608 is configured perform a look up using a look-up table. From the look-up table, the read module 608 determines a HAU address that is associated with a target HAU that includes a compressed version of the target data sector to be read from the storage device. The read module 608 also determines from the look-up table an identifier that indicates a position within the target HAU that includes the particular LAU associated with the data sector. The read module 608 generates a descriptor that includes the HAU address and the identifier. The HAU address is a physical address where the HAU is stored on the storage device.

The read module 608 sends the descriptor to the sequencer, which then cooperates with the ECC to retrieve at least the particular LAU that is associated with the data sector, and to provide the compression information and the particular LAU to the hardware data compressor for decompression of the particular LAU. The compression information is included in the sector headers of the sectors stored in the particular LAU.

Upon receipt of a read-modify-write command from the host computing system, a read-modify-write (RMW) module 610 performs special operations. For example, the RMW module 610 passes a command to the read module 608 to read a target data sector, thereby prompting the read module 608 to consult the look-up table and to execute the read operation, as discussed above. The RMW module 610 sends an instruction to the write module 604 to cause the adaptor to retrieve the new data from the host computing system and for the compressor to compress the new data sectors. The RMW module 610 prompts the compactor module 606 to calculate a new compression ratio for any LAU or LAUs impacted by the RMW operation, and to determine a new compacting scheme. The compactor module 606 then modifies the look-up table as appropriate to reflect the new compacting scheme, prepares a descriptor, and causes the sequencer and the ECC to write the modified data sectors to the storage device.

A garbage collection module 612 is configured to perform various garbage collection functions, including conventional garbage collection functions. As noted above, the compactor module 606 may perform various compacting operations during garbage collection operations. Thus, the garbage collection module 612 is configured to initiate such operations as appropriate. For example, the garbage collection module 612 may cause the compactor module 606 to group various LAUs currently stored singly on the storage device together such that they are re-written to the storage device in groups of two or more LAUs per HAU. The compactor module 606 will utilize the compression information determined upon compression to perform the compacting of the LAUs during garbage collection.

Example Operations for Compression and Compacting

Figure 7:
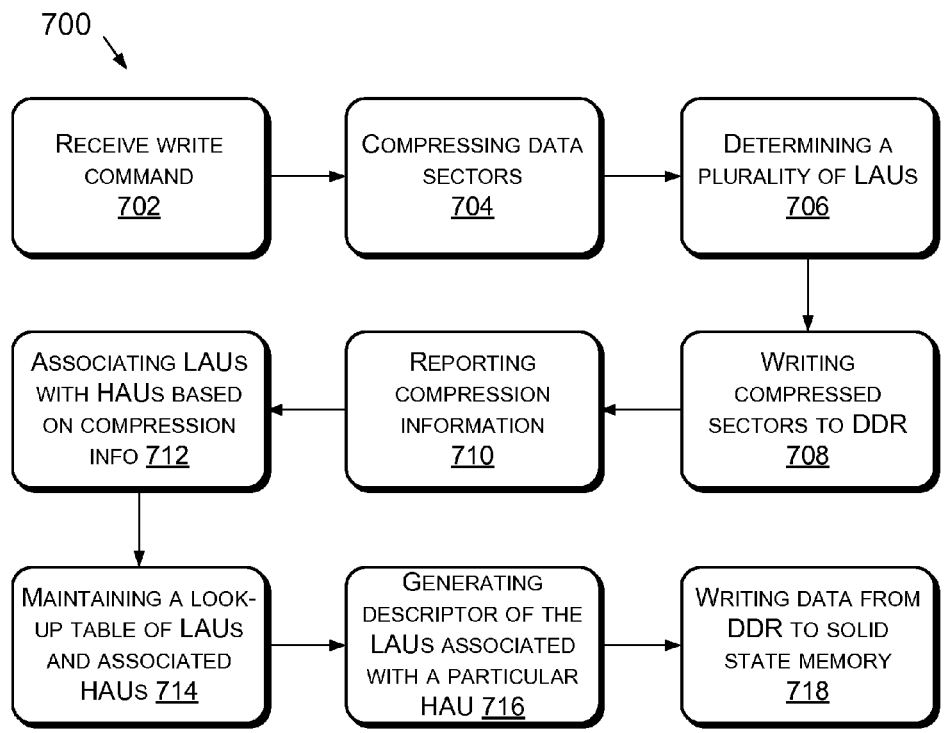
FIG. 7 is a flowchart showing an example of a process of writing compressed and compacted data in accordance with various embodiments.

FIG. 7 is a flowchart showing an example of a process of writing compressed and compacted data in accordance with various embodiments. At 702, a firmware module, such as the firmware module 112, receives a write command. The firmware module may direct an adaptor, such as adaptor 102, to receive a plurality of data sectors from a host computing device to be written to a storage device according to the write command.

At 704, a hardware data compressor, such as the hardware data compressor 104, compresses the plurality of data sectors received from the host computing device to produce a plurality of compressed data sectors. The compressed data sectors include sector headers that include compression information—such as compression ratios or percentages—of the compressed data sectors. The compressed data sectors also include other information bytes as is described elsewhere within this Detailed Description.

At 706, the hardware data compressor determines a plurality of LAUs that include corresponding sets of the plurality of compressed data sectors. The sets of compressed data sectors are determined based at least on logical block addresses of the plurality of compressed data sectors. For example, the sets may be based on the bits of the logical block addresses of the plurality of compressed data sectors and a predetermined number of data sectors to be placed into the plurality of LAUs. In one example, eight data sectors are added to the LAUs; thus the fourth least significant bits of the logical block addresses are used to determine the boundaries between LAUs.

At 708, the LAUs, including their corresponding compressed data sectors, are written to a DDR, such as DDR 116. The LAUs are not compacted at this point. Therefore, the LAUs are written to the DDR singly and not as part of a larger unit of data.

At 710, the hardware data compressor reports the compression information to the firmware module. The reported compression information may be a compression ratio or percentage. The reported compression information may be determined by rounding up actual compression ratios of the individual ones of the plurality of LAUs, or individual ones of the plurality of data sectors, to one of a plurality of compression ratios of a schedule of ratios.

At 712, the hardware data compressor associates sets of one or more of the plurality of LAUs with corresponding hardware addressable units (HAUs) based at least on reported compression ratios of the plurality of LAUs. The sets of LAUs are based on sizes of the individual ones of the plurality of LAUs as determined by the reported compression ratios. In embodiments, only consecutively received LAUs are grouped together into a HAU. In other embodiments, non-consecutive LAUs may be grouped together into a HAU.

At 714, the firmware maintains a look-up table that associates LAU addresses to HAU addresses as well as positions of the LAUs within their corresponding HAUs.

At 716, the firmware module generates a descriptor that indicates the LAUs grouped together into a particular HAU. The descriptor is passed to a sequencer.

At 718, the sequencer cooperates with an ECC to write the HAUs, including their corresponding sets of one or more LAUs to the storage device based on the descriptors. The HAUs may be written along with associated headers that indicate the number of LAUs within the HAUs. As noted above, the writing of multiple LAUs into compact HAUs may be performed as part of a program (write) operation of the storage device, a read-modify-write operation of the storage device, and a garbage collection operation of the storage device. For example, compressed data may be initially written to the storage device without compacting, and then compacted as part of a garbage cleanup operation. Additionally or in the alternative, compressed data may be initially written to the storage device into compact HAUs with multiple LAUs.

Figure 8:
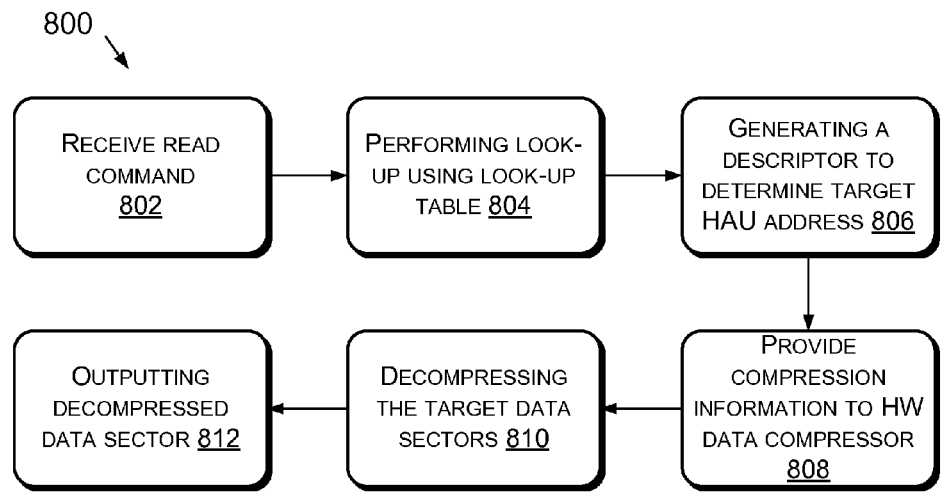
FIG. 8 is a flowchart showing an example of a process of reading and decompressing data in accordance with various embodiments.

FIG. 8 is a flowchart showing an example of a process of reading and decompressing data in accordance with various embodiments. At 802, a firmware module, such as the firmware module 112, receives a read command from a host computing system to read a target data sector or sectors from the storage device. The read command is accompanied by a logical block address of the target data sector or sectors.

At 804, the firmware module performs, based on the target logical block address, a look-up using a look-up table that associates LAU addresses to HAU addresses. The look-up operation determines an address of a target HAU that includes a target LAU that, in turn, includes the target sector or sectors. The look-up operation also determines a relative position of the target LAU within the target HAU.

At 806, the firmware module generates a descriptor including an address of the target HAU and an indicator that indicates the position of the target LAU within the target HAU. The indicator may be a mask, or other data indicating a relative position within the LAU. A mask may be used for example when multiple LAUs are being read from a single HAU.

At 808, the compression information is provided to the hardware data compressor. The compression information is retrieved from the sector headers of the compressed data sectors within the LAUs. The compression information may be passed to the hardware data compressor via the firmware module or directly to the hardware data compressor via the DDR from the storage device.

At 810, the hardware data compressor decompresses the target data sector(s) based on the compression information. At 812, the decompressed data sector(s) are output to the host computing system.

Computer-Readable Media

Depending on the configuration and type of computing system used, memory 110 may include volatile memory (such as random access memory (RAM)) and/or non-volatile memory (such as read-only memory (ROM), flash memory, etc.). Memory 110 may also include additional removable storage and/or non-removable storage including, but not limited to, flash memory, magnetic storage, optical storage, and/or tape storage that may provide non-volatile storage of computer readable instructions, data structures, program modules, and other data.

Memory 110 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Operations of processes 700 and 800 can be suitably combined and may comport with techniques and/or configurations described in connection with FIGS. 1-6 in various embodiments.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. An apparatus, comprising:
a hardware data compressor configured to
compress a plurality of data sectors received from a host to form a plurality of compressed data sectors,
group the plurality of compressed data sectors into a first logical addressable unit, and
determine compression information associated with the first logical addressable unit;
a compactor module configured to determine, based at least on the compression information associated with the first logical addressable unit, a compacting arrangement wherein the first logical addressable unit is compacted, with one or more second logical addressable units, into a corresponding hardware addressable unit of a storage device; and
a write module configured to cause the logical addressable unit and the one or more second logical addressable units to be written, according to the determined compacting arrangement, to the hardware addressable unit of the storage device.

2. The apparatus of claim 1, wherein the hardware data compressor is further configured to determine the plurality of data sectors to be grouped into the first logical addressable unit based at least on logical block addresses of the plurality of data sectors.

3. The apparatus of claim 2, wherein the compactor module is further configured to determine, based on bits of the logical block addresses, a logical addressable unit address of the first logical addressable unit.

4. The apparatus of claim 1, further comprising:
an adaptor that includes the hardware data compressor; and
a double data rate device that is operationally situated between the adaptor and the storage device.

5. The apparatus of claim 1, wherein:
the compactor module is further configured to maintain a look-up table;
the look-up table maps, according to the determined compacting arrangement, logical addressable unit addresses associated with the first logical addressable unit and the one or more second logical addressable units to a corresponding hardware addressable unit address associated with the hardware addressable unit; and
the look-up table indicates a position within the hardware addressable unit that includes the first logical addressable unit.

6. The apparatus of claim 1, wherein:
the compression information indicates a reported compression ratio associated with the plurality of logical addressable unit; and
the compactor module is further configured to determine, based at least on the reported compression ratio, the compacting arrangement.

7. The apparatus of claim 1, wherein:
the compression information indicates a reported compression ratio associated with the first logical addressable unit; and
the hardware data compressor is further configured to determine the reported compression ratio by rounding up an actual compression ratio of the first logical addressable unit to a nearest one of a schedule of compression ratios.

8. The apparatus of claim 1, wherein:
the write module is further configured to determine a header for the hardware addressable unit; and
the header includes a number of logical addressable units stored in the hardware addressable unit.

9. The apparatus of claim 1, further comprising a read module configured to:
perform a look up using a look-up table in order to determine a hardware addressable unit address associated with a target hardware addressable unit that includes a compressed one of a target data sector to be read from the storage device, wherein the look up using the look-up table also determines an identifier that indicates a position within the target hardware addressable unit that includes a third logical addressable unit associated with the target data sector; and
generate a descriptor that includes the hardware addressable unit address and the identifier.

10. The apparatus of claim 9, further comprising:
an error correction circuit; and
sequencer hardware configured to utilize the descriptor to cooperate with the error correction circuit to retrieve at least the third logical addressable unit associated with the target data sector.

11. The apparatus of claim 1, wherein the storage device is a solid state device.

12. A method, comprising:
compressing a plurality of data sectors received from a host computing device to produce a plurality of compressed data sectors;
based at least on logical block addresses of the plurality of compressed data sectors, grouping ones of the compressed data sectors into a plurality of logical addressable units;
based at least on compression ratios of the plurality of logical addressable units, associating sets of two or more of the plurality of logical addressable units with corresponding hardware addressable units; and
writing the hardware addressable units, including their corresponding sets of at least one of the plurality of logical addressable units, to a storage device.

13. The method of claim 12, wherein the writing is performed as part of one of a program operation of the storage device, a read-modify-write operation of the storage device, or a garbage collection operation of the storage device.

14. The method of claim 12, further comprising maintaining a look-up table that associates logical addressable unit addresses to hardware addressable unit addresses and to positions within the corresponding hardware addressable units.

15. The method of claim 14, wherein the determining the plurality of logical addressable units is further based on a predetermined number of data sectors to be placed into the plurality of logical addressable units.

16. The method of claim 12, further comprising:
receiving a read command to read a target data sector;
performing a look-up using a look-up table that associates logical addressable unit addresses to hardware addressable unit addresses to determine a descriptor that includes a target hardware addressable unit address of a target hardware addressable unit that corresponds to the target data sector, and a mask that indicates a position within the target hardware addressable unit of a target logical addressable unit that corresponds to the target data sector; and
based on the descriptor, retrieving the target data sector from the storage device.

17. The method of claim 12, wherein:
the compression information indicates reported compression ratios associated with individual ones of the plurality of logical addressable units; and
the method further includes, based on sizes of the individual ones of the plurality of logical addressable units determined based at least on the reported compression ratios, determining the sets of at least one of the plurality of logical addressable units.

18. The method of claim 17, further comprising determining the reported compression ratios by rounding up, to ones of a schedule of compression ratios, actual compression ratios of the individual ones of the plurality of logical addressable units.

19. The method of claim 12, wherein the storage device is a solid state device.

20. A method, comprising:
receiving a command from a host computer system to read a target data sector from a storage device, wherein the target data sector has a target logical block address;
based on the target logical block address of the target sector, determining a target hardware addressable unit of the storage device in which is stored a plurality of logical addressable units, the plurality of logical addressable units in the target hardware addressable unit including a target logical addressable unit, the target logical addressable unit containing a plurality of compressed data sectors including a target compressed data sector corresponding to the target data sector;

determining a position of the target logical addressable unit within the hardware addressable unit;

based at least on the position of the target logical addressable unit, retrieving, from the target hardware addressable unit of the storage device, at least the target logical addressable unit that includes the target compressed data sector and compression information associated with the target data sector; and based at least on the compression information associated with the target data sector, decompressing the target compressed data sector to produce the target data sector.

21. The method of claim 20, further comprising outputting the target data sector to the host computer system.

22. The method of claim 20, further comprising determining:

a target hardware addressable unit address of the target hardware addressable unit that includes the target logical addressable unit; and a relative position of the target logical addressable unit within the target hardware addressable unit.

23. The method of claim 20, wherein the storage device is flash memory.

* * * * *